United States Patent
Adldinger et al.

(10) Patent No.: US 10,530,024 B2
(45) Date of Patent: Jan. 7, 2020

(54) DEVICE FOR CONTROLLING THE TEMPERATURE OF AN ELECTRICAL ENERGY STORE ON THE MOTOR VEHICLE SIDE

(71) Applicant: Gentherm GmbH, Odelzhausen (DE)

(72) Inventors: Martin Adldinger, Holzheim (DE); Marco Ranalli, Augsburg (DE); Wei Zhou, Ingolstadt (DE); Uwe Gerlinger, Kipfenberg (DE)

(73) Assignee: Gentherm GmbH, Odelzhausen (DE)

( * ) Notice: Subject to any disclaimer, the term of this patent is extended or adjusted under 35 U.S.C. 154(b) by 438 days.

(21) Appl. No.: 15/308,942

(22) PCT Filed: Apr. 30, 2015

(86) PCT No.: PCT/DE2015/000209
§ 371 (c)(1),
(2) Date: Nov. 4, 2016

(87) PCT Pub. No.: WO2015/169273
PCT Pub. Date: Nov. 12, 2015

(65) Prior Publication Data
US 2017/0077570 A1    Mar. 16, 2017

(30) Foreign Application Priority Data

May 8, 2014 (DE) .......................... 10 2014 006 733

(51) Int. Cl.
*H01M 10/667* (2014.01)
*H01M 10/625* (2014.01)
*H01M 10/6567* (2014.01)
*H01M 10/6572* (2014.01)
(Continued)

(52) U.S. Cl.
CPC ...... *H01M 10/667* (2015.04); *B60H 1/00278* (2013.01); *B60H 1/00285* (2013.01);
(Continued)

(58) Field of Classification Search
CPC . H01M 10/667; H01M 10/613; H01M 10/615
See application file for complete search history.

(56) References Cited

U.S. PATENT DOCUMENTS

| 5,117,638 A | 6/1992 | Feher |
| 2004/0135550 A1 | 7/2004 | Nishihata et al. |

(Continued)

FOREIGN PATENT DOCUMENTS

| DE | 102010021901 A1 | 12/2011 |
| DE | 102012018089 A1 | 3/2014 |

(Continued)

OTHER PUBLICATIONS

International Search Report from the European Patent Office for Application No. PCT/DE2015/000209, dated Aug. 18, 2015.
(Continued)

*Primary Examiner* — Abdullah A Riyami
*Assistant Examiner* — Nader J Alhawamdeh
(74) *Attorney, Agent, or Firm* — The Dobrusin Law Firm, P.C.

(57) ABSTRACT

The invention relates to a device for controlling the temperature of an electrical energy store on the motor vehicle side, comprising at least one temperature control system having at least one pettier element, which can be thermally coupled, or is thermally coupled, with the electrical energy store on the motor vehicle side, or to an electrical energy store on the motor vehicle side to be temperature-controlled, wherein in addition, the at least one temperature control system is thermally coupled with at least one temperature-control fluid reservoir containing at least one temperature-control fluid.

20 Claims, 1 Drawing Sheet

Figure 1:
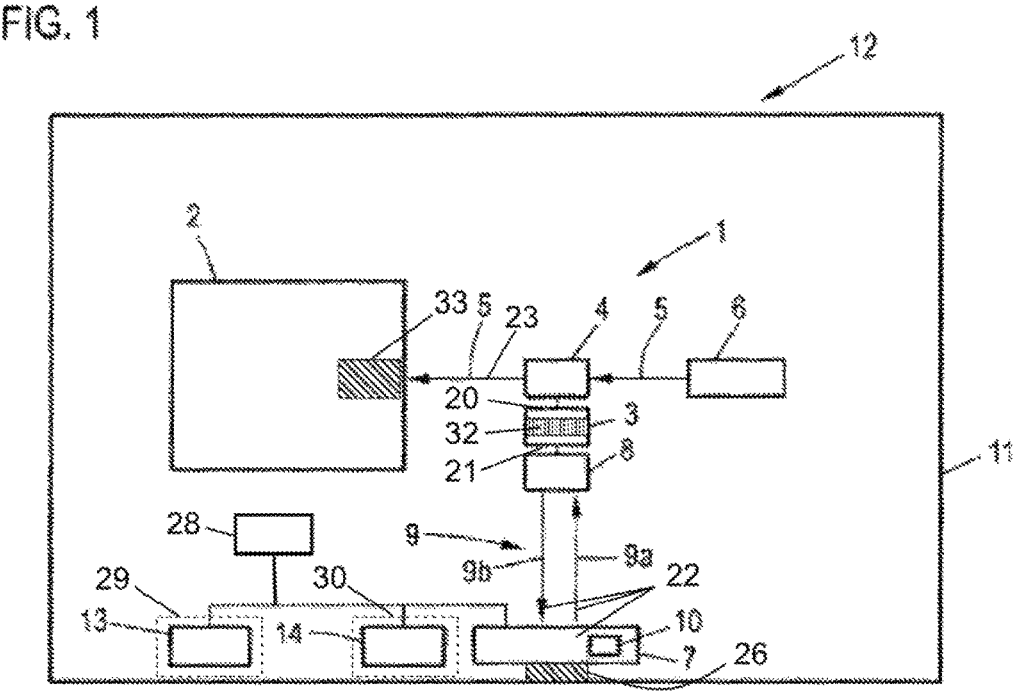

(51) Int. Cl.
*H01M 10/66* (2014.01)
*H01M 10/6561* (2014.01)
*B60H 1/00* (2006.01)
*H01M 10/613* (2014.01)
*H01M 10/615* (2014.01)
*H01M 10/63* (2014.01)
*H01M 10/6556* (2014.01)
*H01M 10/663* (2014.01)
*B60R 1/06* (2006.01)
*B60R 16/033* (2006.01)

(52) U.S. Cl.
CPC ....... *B60H 1/00292* (2013.01); *B60R 1/0602* (2013.01); *H01M 10/613* (2015.04); *H01M 10/615* (2015.04); *H01M 10/625* (2015.04); *H01M 10/63* (2015.04); *H01M 10/6556* (2015.04); *H01M 10/6561* (2015.04); *H01M 10/6567* (2015.04); *H01M 10/6572* (2015.04); *H01M 10/66* (2015.04); *H01M 10/663* (2015.04); *B60H 2001/00307* (2013.01); *B60R 16/033* (2013.01); *H01M 2220/20* (2013.01)

(56) References Cited

U.S. PATENT DOCUMENTS

| | | | |
|---|---|---|---|
| 2006/0254284 A1 | 11/2006 | Ito et al. | |
| 2011/0214838 A1* | 9/2011 | Akiyama | B60H 1/00278 165/41 |
| 2014/0075962 A1 | 3/2014 | Freese et al. | |
| 2016/0297280 A1* | 10/2016 | Riederer | B60H 1/00278 |
| 2017/0077570 A1* | 3/2017 | Adldinger | B60H 1/00278 |

FOREIGN PATENT DOCUMENTS

| | | |
|---|---|---|
| EP | 1932695 A1 | 6/2008 |
| EP | 2366568 A1 | 9/2011 |

OTHER PUBLICATIONS

Written Opinion from the European Patent Office for Application No. PCT/DE2015/000209, dated Aug. 18, 2015.

* cited by examiner

DEVICE FOR CONTROLLING THE TEMPERATURE OF AN ELECTRICAL ENERGY STORE ON THE MOTOR VEHICLE SIDE

The invention relates to a device for controlling the temperature of an electrical energy store on the motor vehicle side, comprising at least one temperature control system having at least one peltier element, which can be thermally coupled or is thermally coupled with the or an electrical energy store on the motor vehicle side to be temperature-controlled.

Such devices for temperature control, i.e., for heating or cooling, of electrical energy stores are known in principle and used in the sector of motor vehicle technology. Corresponding devices typically comprise temperature control systems, which in turn comprise or are designed as electrical transducers in the form of peltier elements.

Corresponding temperature systems are to be coupled with a heat sink or a heat source, depending on the operating mode. In the sector of motor vehicle technology, it is conventional, in this context, to use the air surrounding the temperature control system as heat sink or heat source.

This approach is in need of improvement with a view to an efficient operation or with a view to the power potential of corresponding temperature control systems or devices comprising such temperature control systems.

The underlying aim of the invention therefore is to provide an improved device for the temperature control of an electrical energy store on the motor vehicle side.

The aim is attained by a device of the type mentioned at the beginning, which is characterized according to the invention in that the at least one temperature control system is moreover thermally coupled with at least one temperature-control fluid reservoir containing at least one temperature-control fluid.

Me principle according to the invention relates to a special device for the temperature control of at least one electrical energy store on the motor vehicle side that can be connected or is connected, i.e., indirectly or directly, to a portion of a body of a motor vehicle.

An electrical energy store, referred to in abbreviated form below as energy store, is understood to mean art arrangement consisting of an electrical energy storage cell or several electrical energy storage cells electrically connected to one another, which is (are) accommodated in an energy store housing. The term "enemy store" thus always relates to an arrangement of one or more corresponding energy storage cell(s) formed, for example, from an energy store material based on lithium or a lithium compound, cell(s) which is (are) accommodated in an energy store housing. Usually, electrical connection means are installed on the energy store housing, by means of which an electrical connection of the energy store to at least one third object is possible, such as, for example, to an electrical generator or to an electrical consumer.

The device comprises at least one temperature control system. The temperature control system is thermally coupled with the energy store(s) to be temperature-controlled. The thermal coupling of the temperature control system with the energy store(s) to be temperature-controlled enables an indirect or direct heat exchange between the temperature control system and the energy store(s) to be temperature-controlled and thus a heating or cooling of the energy store(s) to be temperature-controlled. The term "temperature control" thus refers equally to heating and also to warming In the pertinent professional circles, the term "conditioning" is frequently used instead of the term "temperature control."

The temperature control system comprises at least one peltier element or is designed as such a peltier element. A peltier element in general is understood to mean a thermoelectric transducer which—based on the peltier effect—is designed or installed so that, when an electrical current is applied, it becomes cooler on a first heat exchange surface and warmer on a second heat exchange surface. Typically, the corresponding, generally cuboid peltier elements consist of an arrangement of different doped or configured semiconductor elements which, when energized, in each case assume different temperature levels in comparison to a given starting temperature. Therefore, depending on current intensity and current direction, a targeted warming of a first heat exchange surface of a pettier element and correspondingly a targeted cooling of a second heat exchange surface of the peltier element, or vice versa, can be implemented. The heat exchange surfaces of the pettier element are brined from aluminum oxide, for example. The semiconductor elements of the peltier element are typically p-doped or n-doped. In concrete terms, these elements can be bismuth telluride or silicon germanium, for example.

The electrical energy (cumin) required for the operation of the pettier element can be provided, for example, via the energy store to be temperature-controlled and/or via an additional electrical energy store on the motor vehicle side.

According to the invention, the at least one temperature control system is additionally thermally coupled with at least one temperature-control fluid reservoir which contains at least one temperature-control fluid. The additional thermal coupling, of the temperature control system with the or with the at least one temperature-control fluid reservoir enables an indirect or direct heat exchange between the temperature control system and temperature-control fluid reservoir.

The thermal coupling of the temperature control system with a corresponding temperature-control fluid reservoir increases the performance or the efficiency of the temperature control system considerably. This is the result of the fact that the temperature-control fluid reservoir, in particular the temperature-control fluid contained therein, which is, for example, water or a mixture of water and at least one organic fluid, in particular glycol, can be used as heat sink or heat source.

The use of a corresponding temperature-control fluid reservoir or a temperature-control fluid, respectively, as a heat sink or heat source associated with the temperature control system enables the achievement of high thermal mass flows, in particular in comparison to the use of a gas such as, for example, air, in the prior art. Therefore, in a cooling operation of the temperature control system, waste heat generated by the operation can be removed better and more rapidly, which leads to an increase in the efficiency or the effectiveness. In the same way, in a heating operation of the temperature control system, heat can optionally be supplied more rapidly and better. The result is an overall improved temperature control ability or temperature control of the energy store(s) to be temperature-controlled and thus an overall improved device.

As mentioned, the temperature control system can be thermally coupled indirectly or directly or an energy store(s) to be temperature-controlled. Advantageously, an indirect thermal coupling is provided, according to which the temperature control system can be thermally coupled or is thermally coupled with the or an energy store via at least one first heat exchanger connected between the temperature control system and the energy store, through which a temperature-control medium, in particular a gaseous temperature-control medium, can flow or flows.

The first heat exchanger is typically connected at least in some sections in a channel structure through which a temperature-control medium can flow or flows, in order to accordingly control the temperature of the control medium flowing through this channel structure. Therefore, by means of the first heat exchanger, a heat exchange between the temperature control system and a corresponding temperature-control medium is possible. The channel structure adjoins the energy store to be temperature-controlled or it extends in or through this energy store, so that a sufficient heat exchange between the energy store and the temperature-control medium flowing through this energy store is possible. The energy store typically has supply means for supplying a temperature-control medium to be fed into this energy store and discharge means for discharging a temperature-controlled medium to be discharged from this energy store, typically after it has flowed through same.

In principle, the temperature-control medium can be a gas or a gas mixture, or a fluid or a fluid mixture. The use of gases. i.e., for example, air, is to be preferred with a view to safety aspects, since, in this manner, in particular in comparison to electrically conductive fluids, i.e., for example, water, the risk of electrical short circuits within the energy store and thus of potentially associated damage to the energy store is reduced.

In order to convey the or a corresponding temperature-control medium, at least one conveying system can be present for conveying the or a temperature-control medium along at least one heat exchange surface on the temperature control system side or along a heat exchange surface of a heat exchanger downstream of the temperature control system. Depending on whether the temperature-control medium is a fluid or a gas, the first conveying system can comprise or be designed as at least one pump system, such as, for example, a rotary pump, or at least one suction and/or blower system such as, for example, a fan.

As also mentioned, the temperature control system can be thermally coupled in addition indirectly or directly with the at least one temperature-control fluid reservoir. Advantageously, here too an indirect thermal coupling is provided, according to which the temperature control system is thermally coupled with the temperature-control fluid reservoir via at least one additional heat exchanger connected between the temperature control system and the temperature-control fluid reservoir. Therefore, by means of the additional beat exchanger, a heat exchange between the temperature control system and the temperature-control fluid reservoir or the temperature-control fluid, respectively, is possible.

Here it is conceivable that the at least one heat exchanger is connected to the temperature-control fluid reservoir forming a temperature control circuit through which the temperature-control fluid can flow or flows. Therefore, between the additional heat exchanger and the temperature-control fluid reservoir, a line structure is formed, within which the temperature-control fluid can flow or circulate from the temperature-control fluid reservoir into the additional beat exchanger, or vice versa. The line structure accordingly comprises, in particular, a supply line from the temperature-control fluid reservoir into the additional heat exchanger and a supply line from the additional heat exchanger into the temperature-control fluid reservoir.

In order to convey the temperature-control fluid through such a temperature control circuit, an additional conveying system is advantageously present for conveying the temperature-control fluid through a temperature control circuit connecting the heat exchanger to the temperature-control fluid reservoir. Such a conveying system cart comprise or be designed as at least one pump system such as, for example, a rotary pump. The conveying system can be integrated in the temperature-control fluid reservoir.

The invention moreover relates to an energy store arrangement comprising at least one energy store on the motor vehicle side and at least one device according to the invention for the temperature control thereof. Therefore, all the explanations in connection with the device according, to the invention and in connection with the associated described variants apply analogously to the energy store arrangement according to the invention.

The energy store arrangement can comprise an accommodation system comprising an accommodation space that can be closed off or is closed off from the outside, for accommodating the at least one electrical energy store and the device. By means of such a housing-type accommodation system or in such an accommodation system, within which, in particular, the energy store(s) to be temperature-controlled as well as the device, i.e., in particular the temperature control system associated with it, can be arranged, an additional temperature control circuit surrounding the energy store(s) on the outside can be implemented.

In particular, by means of a corresponding accommodation system, the formation of four different temperature control zones is possible, which will be explained in further detail below in connection with exemplary possibilities of a heating or cooling operation that can or is implemented by means of the device or by means of the temperature control system(s) associated with this device.

In this context, a first temperature control zone is formed within the energy store(s) to be temperature-controlled second temperature control zone is formed by the energy store(s) to be temperature-controlled within the area of the accommodation space surrounding the accommodation system on the outside. A third temperature control zone is formed by a temperature circuit formed between the temperature control system and the temperature-control fluid reservoir, through which the temperature-control fluid flows. A fourth temperature control zone is formed by the area surrounding the accommodation system on the outside, i.e., the surrounding area outside of the accommodation system. As can be seen below, the temperature control zones typically differ in terms of their respective temperatures or heat contents.

In a heating operation of the device, the temperature-control medium is heated by means of the temperature control system in such a manner that the highest temperature prevails in the first temperature control zone. The temperature of the first temperature control zone is thus above the temperature of the remaining temperature control zones. Accordingly, in the first temperature control zone, a heating or warming of the energy store occurs. The outlet temperature of the temperature-control medium exiting from the energy store into the accommodation space on the accommodation system side is below the inlet temperature into the energy store due to the heating or warming of the energy store.

Nevertheless, the outlet temperature of the temperature-control medium exiting from the energy store into the accommodation space is typically higher than the temperature of the medium present in the accommodation space. i.e., typically air, so that the second temperature control zone warms up. In this manner, an additional heating of the external surfaces of the energy store and thus an external heating can be implemented, which results in a very efficient heating operation. The medium present in the accommodation space can thus also be used as corresponding temperature-control medium.

In the third temperature control zone, the heat required for warming the temperature-control medium before the entry into the energy store and thus into the first temperature control zone is provided via the temperature control system. In this context, the temperature-control fluid reservoir or the temperature-control fluid, respectively, can be used as heat source, in order to promote the fastest and most efficient possible warming of the temperature-control medium. The temperature-control fluid reservoir or the temperature-control fluid, respectively, is cooled in the process by the removal of heat. Therefore, the temperature or the heat content of the temperature control fluid reservoir or of the temperature-control fluid, respectively, decreases. However, via heat releasing or beat generating components or systems present on the motor vehicle side, heat can be supplied to the temperature-control fluid reservoir or to the temperature-control fluid, respectively.

Corresponding heat releasing or heat generating components or systems present on the motor vehicle side can be, for example, temperature control systems on the motor vehicle side for controlling the temperature of an object on a motor vehicle side, in particular in the form of steering, seat or mirror temperature control systems on the motor vehicle side, and/or temperature control systems for controlling the temperature of a passenger compartment area on the motor vehicle side, for example, in the form of an air conditioner on the motor vehicle side, and/or drive units on the motor vehicle side, i.e., for example, electric motors and/or combustion engines, etc.

In this connection, it is accordingly conceivable that the temperature-control fluid reservoir is thermally coupled with corresponding heat releasing or heat generating systems or components. The thermal coupling can occur by means of heat conducting structures between the respective heat releasing or generating system or component and the temperature-control fluid reservoir. Corresponding thermally conductive structures are formed preferably from materials with good thermal conductivity such as, for example, aluminum, copper, etc. These structures can be introduced or integrated for the purpose mentioned in a targeted manner in the body of the motor vehicle or they can be present in any case on the body side. For the same purpose, heat exchangers thermally coupled with the temperature-control fluid reservoir can also introduced or integrated in the body of the motor vehicle, or they can be connected thereto by thermal coupling.

On the other hand, the temperature-control medium in a cooling operation of the device is cooled by means of the temperature control system in such a manner that the lowest temperature prevails in the first temperature control zone. The temperature of the first temperature control zone is thus below the temperature of the remaining temperature control zones. Accordingly, a cooling of the energy store occurs in the first temperature control zone. The outlet temperature of the temperature-control medium exiting from the energy store into the accommodation space on the accommodation system side is above the inlet temperature into the energy store due to the cooling of the energy store.

Nevertheless, the outlet temperature of the temperature-control medium exiting from the energy store into the accommodation space is typically lower than the temperature of the medium present in the accommodation space, i.e., typically air, so that the second temperature control one is also cooled. In this way, an additional cooling of the outside surfaces of the energy store and thus an external cooling can be implemented, which results in a very efficient cooling operation.

In the third temperature control zone, the heat required for cooling, the temperature-control medium before the entry into the energy store and thus into the first temperature control zone is removed from the temperature-control medium via the temperature control system. In this context, the temperature-control fluid reservoir or the temperature-control fluid, respectively, can be used as heat sink, in order to promote the fastest and most efficient possible cooling of the temperature-control medium. The temperature-control fluid reservoir or the temperature-control fluid, respectively, is heated in the process by the waste heat of the temperature control system. Therefore, the temperature or the heat content of the temperature-control fluid reservoir increases. However, via heat absorbing or heat requiring components or systems present on the motor vehicle side, heat can be removed from the temperature-control fluid reservoir.

Corresponding heat absorbing or heat requiring components or systems present on the motor vehicle side can in principle be corresponding systems or components that were mentioned in the context of the heat releasing or heat generating systems or components present on the motor vehicle side that can be used in the context of the heating operation.

In the same way, it is also possible here that the temperature-control fluid reservoir or the temperature-control fluid, respectively, is thermally coupled with corresponding heat absorbing or heat requiring systems or components, wherein, again, reference is made to the corresponding explanations in connection with the heat releasing or heat generating systems or components present on the motor vehicle side that can be used in the context of the heating operation.

The invention furthermore relates to a motor vehicle comprising at least one energy store arrangement according to the invention. Therefore, all the explanations in connection with the energy store arrangement according to the invention as well as in connection with the associated described variants and accordingly also all the explanations in connection with the device according to the invention as well as with the associated described variants apply analogously to the motor vehicle according to the invention.

Accordingly, the at least one temperature-control fluid reservoir on the device side and thus on the energy store arrangement side is advantageously thermally coupled with at least one temperature control system on the motor vehicle side for controlling the temperature of an object on the motor vehicle side, in particular of at least one steering, seat or mirror temperature control system on the motor vehicle side, and/or with as temperature control system on the motor vehicle side for controlling the temperature of a passenger compartment area on the motor vehicle side, in particular of an air conditioner on the motor vehicle side, and/or of the body of the motor vehicle, in particular, at least one exposed external surface of the body of the motor vehicle and/or a drive unit on the motor vehicle side, such as, for example, an electric motor and/or as combustion ermine.

In general, such an external surface on the motor vehicle side is understood to mean an external surface that is exposed to airflow when the motor vehicle is moving. Via the airflow, heat can be removed from the body of the motor vehicle, which is advantageous particularly with a view to the above-described cooling operation of the device. The exposed external surface of the body of the motor vehicle that is thermally coupled with the at least one temperature-control fluid reservoir is accordingly, tor example, an undercarriage of the motor vehicle.

With a view to an efficient and rapid heat exchange between the temperature-control fluid reservoir or the temperature-control fluid, respectively, and the body of the motor vehicle, i.e., in particular at least one exposed external surface of the body of the motor vehicle, it is advantageous if at least one heat exchanger thermally coupled with the temperature-control fluid reservoir is integrated in the exposed external surface of the body of the motor vehicle that is thermally coupled with the at least one temperature-control fluid reservoir, or in a component on the motor vehicle side comprising such an exposed external surface.

Further advantages, features and details of the invention result from the embodiment examples described below and in reference to the drawings. In the drawings:

FIG. 1, 2 show in each case/a basic representation of a device according to an embodiment example of the invention.

FIG. 1 shows a basic representation of a device 1 for controlling the temperature of an electrical energy store 2 on the motor vehicle side, mounted on the motor vehicle side, according to an embodiment example of the invention. The energy store 2 is, for example, as lithium energy store comprising several electrically interconnected, lithium-based energy storage cells (not shown) accommodated in a common energy store housing (not shown). The energy store 2 is used in general for the electrical supply of an electrical consumer on the motor vehicle side and accordingly it is connected to an on-board network (not shown) on the motor vehicle side.

The device 1 comprises at least one temperature control system 3 comprising a peltier element 32. The temperature control system 3 is thermally coupled with the energy store 2 to be temperature-controlled via a first heat exchange surface 20. Accordingly, the energy store 2 can be heated or cooled by means of the temperature control system 3. The electrical supply of the pettier element 32 required for the operation thereof occurs via the energy store 2 to be temperature-controlled.

The thermal coupling between the temperature control system 3 and the energy store 2 is implemented via a heat exchanger 4 connected between said temperature control system and said energy store. In this context, the heat exchanger 4 is connected by means of a channel structure 5, indicated by the arrows, delimiting at least one flow channel through which a temperature-control medium such as air, for example, can flow.

A first conveying system 6 in the form of a blower system is located upstream of the channel structure 5 and used for conveying the temperature-control medium 23 through the channel structure 5, along a heat exchanger surface of the heat exchanger 4 protruding into the channel structure 5 and further on into the energy store 2. The energy store 2 typically has supply means 25 for supplying a temperature-control medium 23 to be fed into this energy store 2 and discharge means 24 for discharging a temperature-controlled medium 23 to be discharged from this energy store 2, typically after it has flowed through same. Typically, only a single conveying system 6 is provided, which results in comparatively low noise generation during operation of the device 1. An additional heat exchanger 33 is downstream of the temperature control system.

The device 1 moreover comprises a temperature-control fluid reservoir 7 containing a temperature-control fluid 22 such as water, for example, in the form of a simple fluid container or tank, for example. One can see that the temperature control system 3 is also thermally coupled with the temperature-control fluid reservoir 7 via a second heat exchange surface 21. The thermal coupling between the temperature control system 3 and the temperature-control fluid reservoir 7 is implemented via an additional heat exchanger 8 connected between the temperature control system and the temperature-control fluid reservoir 7.

It is apparent that the additional heat exchanger 8 is connected to the temperature-control fluid reservoir 7 forming a temperature control circuit through which the temperature-control fluid flows. For this purpose, between the additional heat exchanger 8 and the temperature-control fluid reservoir, a line structure 9 is formed, within which the temperature-control fluid can flow circularly or circulate circularly from the temperature-control fluid reservoir 7 into the additional heat exchanger 8, and vice versa. The line structure 9 comprises a supply line 9a from the temperature-control fluid reservoir 7 into the additional heat exchanger 8, and a supply line 9b from the additional heat exchanger 8 into the temperature-control fluid reservoir 7. The supply lines 9a, 9b again are represented by arrows.

Integrated in the temperature-control fluid reservoir 7 is a conveying system 10 in the form of a pump system, which is used for conveying the temperature-control fluid through the line structure 9 or between the temperature-control fluid reservoir 7 and the additional heat exchanger 8. Naturally, an additional conveying system 10 can also be connected, for example, in the line structure 9.

The temperature-control fluid reservoir 7 or the temperature-control fluid is used as heat sink or heat source associated with the temperature control system 3 and leads to a considerable increase in the performance or the efficiency of the temperature control system 3 or the device 1, respectively. The energy store 2 can accordingly be temperature-controlled, i.e.—heated or cooled, very efficiently.

The temperature-control fluid reservoir 7 is moreover thermally coupled with the body 11 of the motor vehicle 12 or with a component adjoining the body 11 of the motor vehicle 12, or with a system adjoining the body 11 of the motor vehicle 12, such as, for example, a temperature control system 13 on the motor vehicle side air controlling the temperature of a passenger compartment area 29, i.e., in particular, with an air conditioner on the motor vehicle side, or a temperature control system 14 for controlling the temperature of an object 30 on the motor vehicle side, such as, for example, a steering, seat or mirror temperature control system on the motor vehicle side and a drive unit 28 on the motor vehicle side, such as, for example, an electric motor and/or as combustion engine.

Via the temperature control systems 13, 14, heat can be introduced, into the temperature control fluid reservoir 7 and thus into the temperature-control fluid, which can be advantageous for a particularly efficient heating operation of the device 1. In the same way, via the temperature control systems 13, 14, heat can also be removed from the temperature-control fluid reservoir 7 and thus from the temperature-control fluid, which can be advantageous for a particularly efficient cooling operation of the device 1.

The temperature-control fluid reservoir 7 is, in addition, thermally coupled with an exposed external surface of the body 11 of the motor vehicle 12, such as, for example, an undercarriage. In this way, via the airflow produced when the motor vehicle 12 is moving, heat can also be removed from the temperature-control fluid reservoir 7.

Integrated in the exposed outer surface of the body 11 of the motor vehicle 12 that is thermally coupled with the at least one temperature-control fluid reservoir 7, there can be at least one second additional heat exchanger 26, thermally coupled with the temperature-control fluid reservoir 7.

Figure 2:
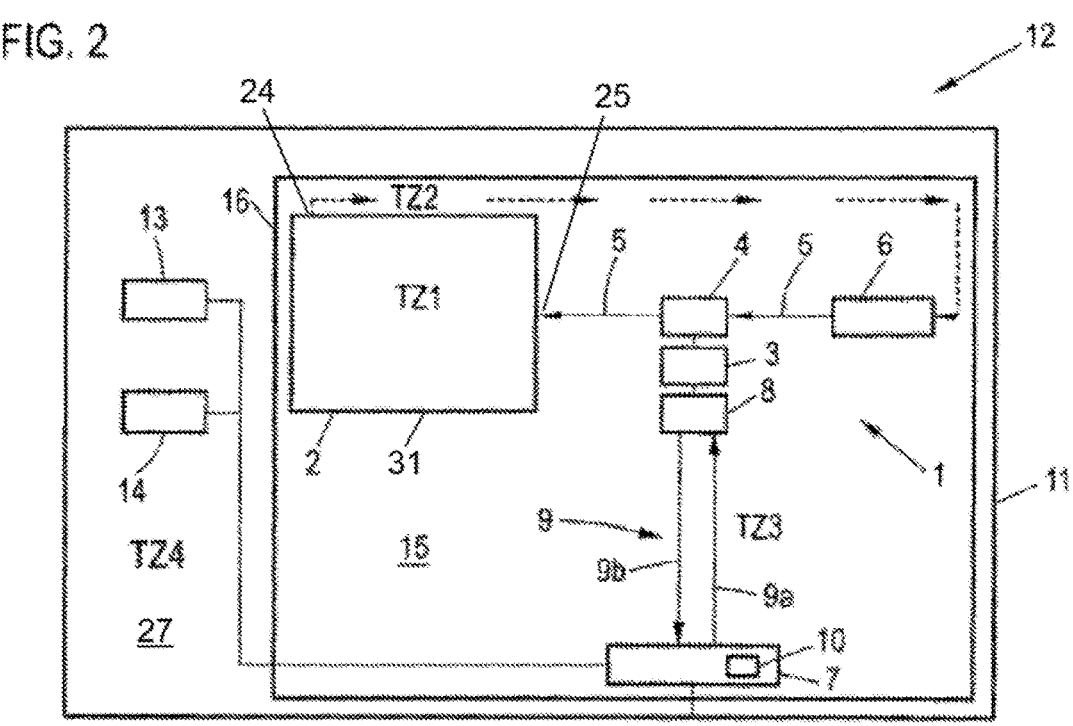

FIG. 2 shows a basic representation of as device 1 for controlling the temperature of an electrical energy store 2 on the motor vehicle side, according to an additional embodiment of the invention.

In contrast to the embodiment example shown in FIG. 1, the energy store arrangement, unspecified but already present in FIG. 1, consisting of energy store 2 and device 1, can here comprise an accommodation system 16, which delimits an accommodation space 15 and which is closed, i.e., sealed of from the outside, in which the device 1 as well as the energy store 2 are accommodated. The accommodation system 16 can have a trough-like shape.

In this way, during operation of the device 1, four different temperature-controlled zones can be formed, i.e., temperature control zones TZ1, TZ2, TZ3, TZ4 having four respective different temperatures and thus different heat contents. In this context, the temperature-control medium flows in particular through the temperature control zones TZ1 and TZ2. The flow of the temperature-control medium is represented by the arrows.

A first temperature control zone TZ1 is formed within the energy store 2 to be temperature-controlled. A second temperature control zone TZ2 is formed by the area of the accommodation space 15 surrounding on the outside the energy store 2 to be temperature-controlled within the accommodation system 16. A third temperature control zone TZ3 is formed by the temperature control circuit, formed between the temperature control system 3 and the temperature-control fluid reservoir 7, through which the temperature-control fluid flows. A fourth temperature control zone TZ4 is formed by the area surrounding the accommodation system 16 on the outside, i.e., the surrounding area 27 outside of the accommodation system 16.

In a heating operation of the device 1, the temperature-control medium is heated by means of the temperature control system 3 in such a manner that the highest temperature prevails in the first temperature control zone TZ1. The temperature of the first temperature control zone TZ1 accordingly is above the temperature of the remaining temperature control zones TZ2, TZ3, TZ4. Accordingly, in the first temperature control zone TZ1, a heating or warming of the energy store 2 occurs. The outlet temperature of the temperature-control medium exiting from the energy store 2 into the accommodation space 15 is below the inlet temperature into the energy store 2 due to heating or warming of the energy store 2 and thus the release of heat to the energy store 2.

In the same way, the outlet temperature of the temperature-control medium exiting from the energy store 2 into the accommodation space 15 is typically above the temperature of the medium present in the accommodation space 15, which is typically also air, so that the second temperature control zone TZ2 is also heated. In this way, an additional heating of the external surfaces 31 of the energy store 2 or of the energy store housing, respectively, and thus a very efficient heating operation of the device 1 are achieved.

In the third temperature control zone TZ3, the heat required for heating the temperature-control medium before the entry into the energy store 2 and thus into the first temperature control zone TZ1 is supplied via the temperature control system 3. Here, the temperature-control fluid reservoir 7 or the temperature-control fluid, respectively, is used as heat source, in order to promote the fastest and most efficient possible heating of the temperature-control medium. The temperature-control fluid reservoir 7 or the temperature-control fluid, respectively, is cooled in the process by removal of heat. Therefore, the temperature or the heat content of the temperature-control fluid reservoir 7 or of the temperature-control fluid, respectively, decreases. However, as mentioned, via heat releasing or heat generating components or systems present on the motor vehicle side, heat can be supplied to the temperature-control fluid reservoir 7. Corresponding heat releasing or heat generating systems present on the motor vehicle side can be for example, the temperature control system 13 on the motor vehicle side for controlling the temperature of a passenger compartment area on the motor vehicle side.

In a cooling operation of the device 1, the temperature-control medium is cooled by means of the temperature control system 3 in such a manner that the lowest temperature prevails in the first temperature control zone TZ1. The temperature of the first temperature control zone TZ1 is thus below the temperature of the remaining temperature control zones TZ2, TZ3, TZ4. Accordingly, a cooling of the energy store 2 occurs in the first temperature control zone TZ1. The outlet temperature of the temperature-control medium exiting from the energy store 2 into the accommodation space 15 is above the inlet temperature into the energy store 2 due to cooling of the energy store 2 and thus the absorption of heat from the energy store 2.

In the same way, the outlet temperature of the temperature-control medium exiting from the energy store 2 into the accommodation space 15 is typically below the temperature of the medium present in the accommodation space 15, so that the second temperature control zone TZ2 is also cooled. In this way, an additional cooling of the external surfaces 31 of the energy store 2 or of the energy store housing, respectively, and thus a very efficient cooling operation of the device 1 are achieved.

In the third temperature control zone TZ3, the heat required for cooling the temperature-control medium before entry into the energy store 2 and thus into the first temperature control zone TZ1 is removed from the temperature-control medium via the temperature control system 3. In this context, the temperature-control fluid reservoir 7 or the temperature-control fluid, respectively, is used as heat sink, in order to promote the fastest and most efficient possible cooling of the temperature-control medium. The temperature-control fluid reservoir 7 or the temperature-control fluid, respectively, is heated in the process by the waste heat of the temperature control system 3. Therefore, the temperature or the heat content of the temperature-control fluid reservoir 7 or of the temperature-control fluid, respectively, increases. However, via heat absorbing or heat requiring components or systems present on the motor vehicle side, heat can also be removed from the temperature-control fluid reservoir 7. Again, corresponding heat absorbing or heat requiring systems present on the motor vehicle side can be, for example, the temperature control system 13 on the motor vehicle side for controlling the temperature of a passenger compartment area on the motor vehicle side.

The invention claimed is:

1. A device for controlling a temperature of an electrical energy store on a motor vehicle side comprising:
    at least one temperature control system having:
        (a) at least one peltier element with a first side and a second side,
        (b) a first heat exchange surface thermally coupled with the electrical energy store, via a first temperature control circuit, and (c) a second heat exchange surface thermally coupled with at least one temperature-control fluid reservoir, via a second temperature control circuit, the at least one temperature-control reservoir containing at least one temperature-control fluid;

wherein the first side is coupled to the first heat exchange surface and the second side is coupled to the second heat exchange surface.

2. The device according to claim 1, wherein the at least one temperature control system is thermally coupled with or to the electrical energy store via at least one first heat exchanger connected between the at least one temperature control system and the electrical energy store, through which a temperature-control medium flows.

3. The device according to claim 1, wherein the at least one temperature control system is thermally coupled with the at least one temperature-control fluid reservoir via at least one first additional heat exchanger connected between the at least one temperature control system and the at least one temperature-control fluid reservoir.

4. The device according to claim 3, wherein the at least one first additional heat exchanger is connected to the at least one temperature-control fluid reservoir to form the second temperature control circuit through which the at least one temperature-control fluid can flow or flows from the at least one first additional heat exchanger into the at least one temperature-control fluid reservoir, and back to the at least one first additional heat exchanger.

5. The device according to claim 1, wherein the at least one temperature-control fluid is water or a mixture of water and at least one organic fluid.

6. An energy store arrangement, comprising the electrical energy store on the motor vehicle side and the device according to claim 1.

7. The energy store arrangement according to claim 6, wherein an accommodation system comprising an accommodation space which can be or is closed off from an outside for accommodating the electrical energy store and the device.

8. A motor vehicle, comprising the energy store arrangement according to claim 6.

9. The motor vehicle according to claim 8, wherein the at least one temperature-control fluid reservoir is thermally coupled with:
a) the at least one temperature control system on the motor vehicle side for controlling a temperature of an object on the motor vehicle side, that is at least one steering temperature control system, at least one seat temperature control system, or at least one mirror temperature control system on the motor vehicle side;
b) the at least one temperature control system on the motor vehicle side for controlling a temperature of a passenger compartment area on the motor vehicle side, that is at least one air conditioner on the motor vehicle side;
c) body of the motor vehicle, that is at least one exposed external surface of the body of the motor vehicle;
d) a drive unit on the motor vehicle side; or any combination of a) through d).

10. The motor vehicle according to claim 9, wherein at least one second additional heat exchanger, thermally coupled with the at least one temperature-control fluid reservoir, is integrated in the at least one exposed external surface of the body of the motor vehicle or in a component on the motor vehicle side that comprises the at least one exposed external surface, so that heat can be removed from the at least one temperature-control reservoir by an airflow produced by a movement of the motor vehicle.

11. The motor vehicle according to claim 9, wherein the at least one exposed external surface of the body of the motor vehicle that is thermally coupled to the at least one temperature-control fluid reservoir is an undercarriage of the motor vehicle.

12. The device according to claim 2, wherein the temperature control medium is a gaseous temperature-control medium that can flow or flows.

13. The device according to claim 2, wherein at least one first conveying system for conveying the temperature-control medium along the first heat exchange surface on a temperature control system side or along a heat exchange surface of at least one third additional heat exchanger downstream of the at least one temperature control system.

14. The device according to claim 4, wherein at least one first additional conveying system for conveying the at least one temperature-control fluid through the second temperature control circuit connecting the at least one first additional heat exchanger to the at least one temperature-control fluid reservoir.

15. The motor vehicle according to claim 10, wherein the at least one exposed external surface of the body of the motor vehicle that is thermally coupled to the at least one temperature-control fluid reservoir is an undercarriage of the motor vehicle that is exposed to airflow.

16. The energy store arrangement according to claim 7, wherein the accommodation system comprises:
a. a first temperature control zone within the electrical energy store;
b. a second temperature control zone downstream of a discharge means, adjacent the electrical energy store and within the accommodation system;
c. a third temperature control zone between the at least one temperature control system and the at least one temperature-control fluid reservoir; and
d. a fourth temperature control zone outside the accommodation system;
wherein, in a heating operation, heat is provided to the electrical energy store by a temperature control medium flowing from the first heat exchange surface and heat is removed from the at least one temperature-control fluid by the second heat exchange surface;
wherein, in a cooling operation, heat is removed from the electrical energy store by the temperature control medium flowing from the first heat exchange surface and heat is provided to the at least one temperature-control fluid by the second heat exchange surface.

17. The energy store arrangement according to claim 7, wherein a temperature-control medium flows into the accommodation space after exiting the electrical energy store, so that the temperature-control medium further conditions the electrical energy store, after being expelled from the electrical energy store via a discharge means, by contacting an external surface of the electrical energy store.

18. The motor vehicle of claim 9, wherein heat flowing into the at least one temperature-control reservoir can be used to heat the object or the at least one temperature-control reservoir that has been depleted of heat can be used to cool the object.

19. The motor vehicle according to claim 9, wherein heat is provided to the at least one temperature-control fluid reservoir by the drive unit.

20. The device according to claim 3, wherein the temperature-control fluid flows circularly from the at least one temperature-control fluid reservoir into the at least one first additional heat exchanger, or vice versa.

\* \* \* \* \*